No. 760,939.

Patented May 24, 1904.

UNITED STATES PATENT OFFICE.

STONEWALL J. VANCE, OF MOUNTAINGROVE, MISSOURI.

PROCESS OF MAKING ALCOHOL.

SPECIFICATION forming part of Letters Patent No. 760,939, dated May 24, 1904.

Application filed May 9, 1903. Serial No. 156,383. (No specimens.)

*To all whom it may concern:*

Be it known that I, STONEWALL JACKSON VANCE, a citizen of the United States, residing at Mountaingrove, in the county of Wright, State of Missouri, have invented certain new and useful Improvements in Processes of Extracting Sugar from Grain for the Purpose of Manufacturing Alcoholic Spirits; and I hereby declare the following to be a full, clear, and exact description of the invention, such as will enable others skilled in the art to which it appertains to make and use the same.

My invention has relation to the manufacture of spirits from grain or other amylaceous materials, and has for its object the provision of means whereby the percentage of spirits obtained is materially increased.

My invention is designed to cause a more complete conversion of the starchy constituents of the amylaceous material into sugar than has been possible under the processes heretofore known, the result of the conversion being such forms of sugar as offer the least resistance to the action of the fermenting agent. This result is reached by the addition to the primary amylaceous material of a certain quantity of ammonia, which not only attacks, enters into, and decomposes all of the intercellular tissue of the amylaceous material without the aid of heat of high degree or heavy and continued pressure, thereby causing a more complete exposure of the carbohydrates to the action of the diastase of malt, but also aids the diastase of malt in converting the starch into glucose rather than dextrine, thus offering less resistance to the action of the yeast.

My invention is based upon the following chemical reactions: It is known that when starch is split up by the action of diastase at temperatures below 75° centigrade there are formed diastase and dextrine. The dextrine so formed is non-fermentable in the short time allowed for alcoholic fermentation in distilleries, while glucose is so fermentable. For this reason the distiller aims at the most complete conversion of the starch into glucose. This may be accomplished in an imperfect manner by the long-continued action of dilute sulfuric acid upon the starch at a temperature higher than 75° centigrade, and thus much, but not all, of the dextrine may be changed into glucose. Now by the addition of ammonia to the amylaceous material both long-continued heat and sulfuric acid may be dispensed with, and yet the ammonia-treated grain is converted by the action of the diastase of malt directly into glucose in place of dextrine, nor is it necessary to neutralize the solution by the addition of acids, and, as already explained, the property of the ammonia to decompose the cellular tissue exposes all of the starchy constituents to the action of the diastase, thereby producing a complete saccharification at the least expense of time and fuel.

In carrying out my process I proceed as follows: The amylaceous material, preferably Indian corn, is ground to meal for the purpose of facilitating, enhancing, and expediting the action of the ammonia upon the starchy constituents and intercullular tissues of the grain. This is introduced into a heating apparatus with suitable agitating or stirring devices, in which apparatus the meal is mixed with forty-seven gallons of water for each bushel of meal at a temperature of 160° Fahrenheit. As soon as the mash is thoroughly mixed three gallons of ammonia of 26° Baumé are added to each one hundred bushels of grain, and the stirring process is continued until the ammonia is thoroughly diffused among the mash. This having been accomplished, heat is applied until the mash reaches the boiling-point, 212° Fahrenheit. It is not at all necessary to keep up this heat for any length of time, because the moment the boiling-point is reached the amylaceous material is in the best condition for further treatment, and greater or long-continued heat would only serve to retard the subsequent action of the diastase in the ammonia-treated grain. By constant stirring the mash is now cooled to 150° Fahrenheit, at which point seven pounds of malt are added to each bushel of grain. No acid or other neutralizing agent need be used. The mash is then stirred further until it is cooled down to from 75° to 72° Fahrenheit, which temperature is usually reached in from one to two hours. At the expiration of this time it will be found that complete conversion of the starch into glucose has been attained and that the wort is in the best possible condition for the action of the yeast. The wort is transferred to the fermenting-tub and yeast is added in the usual quantity. The fermentation induced by the yeast is allowed to proceed in the usual and well-known manner, but is more effective in producing alcohol because of the complete conversion of the starch into glucose rather than dextrine, the glucose offering less resistance to the fermenting agent than dextrine would. It will be finished in about seventy-two hours, after which the wort is distilled in the ordinary manner.

While under this process none of the by-products are lost or deteriorated, the yield in spirits is increased approximately fifteen per cent.

Having now described my invention, what I claim as new therein, and desire to secure by Letters Patent, is—

In the manufacture of spirits the improvement which consists in mixing the reduced amylaceous material, as grain, with water and ammonia in the manner and for the purposes set forth, bringing the mash to the boiling-point, reducing the temperature to 150° Fahrenheit, adding malt as specified, and after conversion of the starch into glucose, fermenting and distilling in the usual manner.

Signed at Memphis, in the county of Shelby, and State of Tennessee.

S. J. VANCE.

Witnesses:
  DAISY T. B. ZIMMERMANN,
  JOS. H. RITTER.